(12) United States Patent
Yamazaki et al.

(10) Patent No.: US 7,871,549 B2
(45) Date of Patent: Jan. 18, 2011

(54) PRODUCING METHOD FOR FILM

(75) Inventors: Hidekazu Yamazaki, Kanagawa (JP); Koju Ito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 783 days.

(21) Appl. No.: 11/659,478

(22) PCT Filed: Aug. 3, 2005

(86) PCT No.: PCT/JP2005/014606

§ 371 (c)(1),
(2), (4) Date: Feb. 6, 2007

(87) PCT Pub. No.: WO2006/014009

PCT Pub. Date: Feb. 9, 2006

(65) Prior Publication Data

US 2009/0134553 A1 May 28, 2009

(30) Foreign Application Priority Data

Aug. 6, 2004 (JP) .............................. 2004-231212

(51) Int. Cl.
 B29C 44/34 (2006.01)
 B29C 47/88 (2006.01)
 C08J 9/14 (2006.01)
 B29D 7/00 (2006.01)

(52) U.S. Cl. ..................... 264/53; 264/216; 264/211.19

(58) Field of Classification Search ................. 264/45.8, 264/45.9, 50–55, 212, 216, 211.19, 176.1, 264/1.34, 1.6, 41; 156/246

See application file for complete search history.

(56) References Cited

U.S. PATENT DOCUMENTS

| | | | | |
|---|---|---|---|---|
| 4,954,381 A | * | 9/1990 | Cabasso et al. | 428/116 |
| 6,613,433 B2 | * | 9/2003 | Yamamoto et al. | 428/411.1 |
| 6,909,230 B2 | * | 6/2005 | Affinito et al. | 313/504 |
| 2005/0023720 A1 | * | 2/2005 | Takeuchi | 264/216 |

FOREIGN PATENT DOCUMENTS

| | | | |
|---|---|---|---|
| JP | 2001-157574 A | | 6/2001 |
| JP | 2002-335949 A | | 11/2002 |
| JP | 2003-80538 A | | 3/2003 |
| JP | 2003-128832 A | | 5/2003 |
| JP | 2003128832 A | * | 5/2003 |
| JP | 2003-302532 A | | 10/2003 |

OTHER PUBLICATIONS

Supplemental European Search Report, dated Aug. 25, 2008, issued in counterpart application EP Application No. 05780275.3 (6 pages).

* cited by examiner

Primary Examiner—Khanh Nguyen
Assistant Examiner—Matthew Hoover
(74) Attorney, Agent, or Firm—Sughrue Mion, PLLC

(57) ABSTRACT

A polymer solution (21) is prepared by dissolving poly-.ϵ.-caprolactone and amphipathic polyacrylamide in an organic solvent. The polymer solution (21) is cast from a casting die (25) onto a casting belt (26) to form a casting film (40). Air (35) from a blowing and suctioning device (34) is sent to the casting film (40) to generate droplets (44). The relative speed of drying air (37) to the moving speed of the casting belt (26) is adjusted at 5 m/min in parallel flow. The water in the drying air (37) is condensed in the casting film (40) to form the droplets (44). The droplets (44) are evaporated after evaporating the organic solvent in the casting film (40), so that a honeycomb-structure film (12) can be obtained.

43 Claims, 11 Drawing Sheets

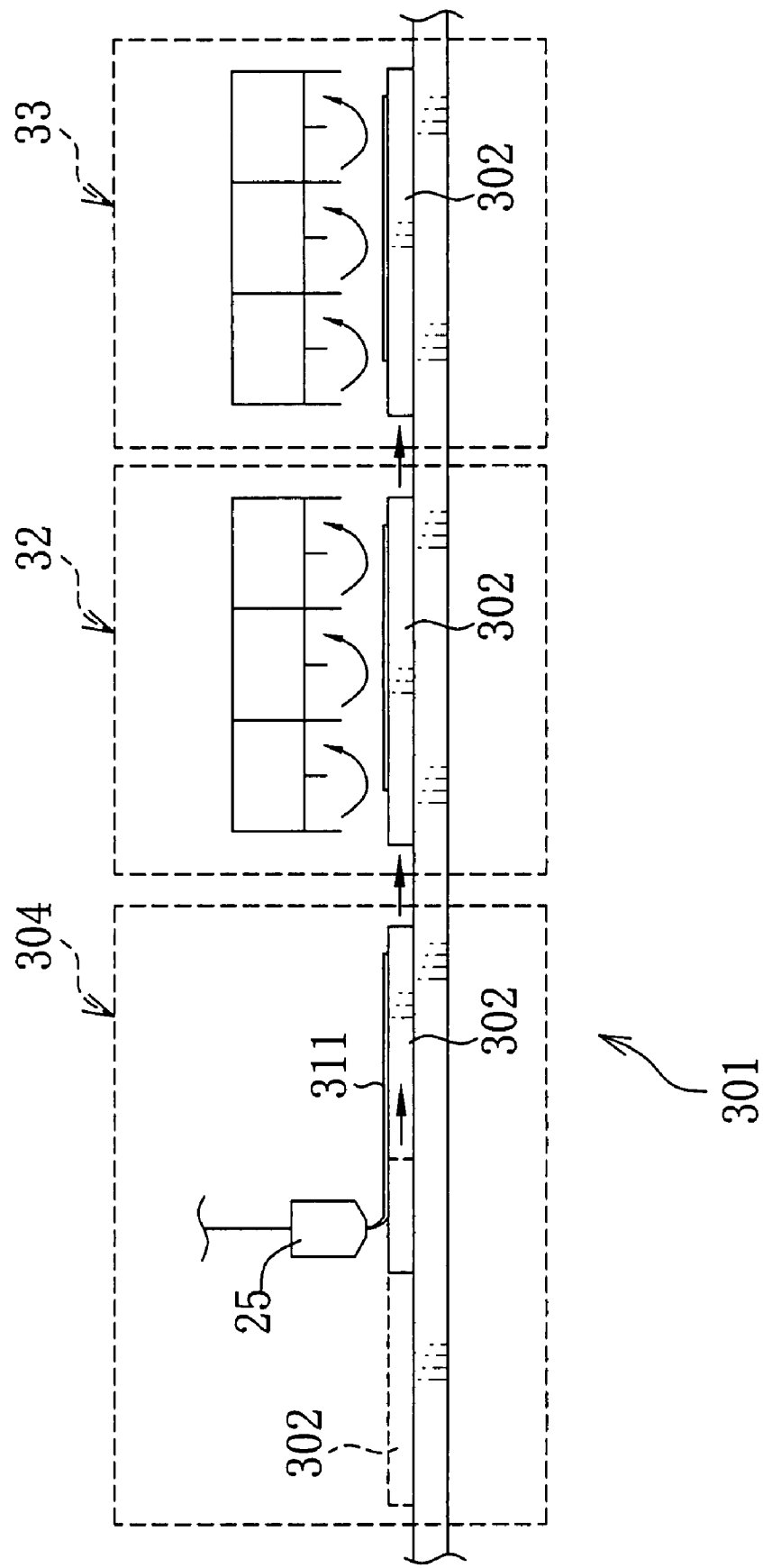

PRODUCING METHOD FOR FILM

TECHNICAL FIELD

The present invention relates to a producing method for a film having a fine-pattern structure.

BACKGROUND ART

In the field of optical materials and electronic materials, an improvement in an integration degree, higher density in an information amount, and higher definition of image information are required. Therefore, it is necessary to form a fine structure (hereinafter referred to as a fine-pattern structure) in the film used in such field. Especially, in regenerative medicine, the film having the fine-pattern structure on the surface is effective as a cell culture substrate (see. Japanese Patent Laid-Open Publication No. 2001-157574).

As a method for forming the fine-pattern structure in the film, a deposition method using a mask, photolithography technology using photochemical reaction and polymerization reaction, laser ablation technology and so forth come into practical use.

It is known to obtain a film having a honeycomb structure of on the micron scale by casting dilute solution of polymer, which has a special structure, under a high-humidity condition (see. Japanese Patent Laid-Open Publication No. 2002-335949). Functional particles are contained in that film, so that the film is used as the optical and electronic materials. For instance, the film is used as a display device by containing light-emitting material (see. Japanese Patent Laid-Open Publication No. 2003-128832).

The film in which the fine-pattern structure is formed is also used in a polarizing filter. As such a film, there is a film having a moth-eye structure for developing an antireflective function. The fine pattern having a size from submicron to several tens of microns is regularly formed in that film. In a mainstream method for forming the fine pattern, the structure of a plate, which is made by using micro-processing technique, for instance the photolithography, is transferred on the film (see. Japanese Patent Laid-Open Publication No. 2003-302532).

The method described in Japanese Patent Laid-Open Publication No. 2003-302532 is called a top-down approach to make the plate for determining the fine structure. Many complicate procedures are required to make the plate, and the cost is increased. Additionally, it is difficult to make the plate having a large area.

An object of the present invention is to provide a method for producing continuously or intermittently a large area film having a uniform honeycomb or moth-eye structure at low cost.

DISCLOSURE OF INVENTION

In order to achieve the above and the other object, in a producing method for a film of the present invention, a film is formed by casting a liquid including an organic solvent and a polymer compound on a support; droplets are formed in the film; and plural voids are formed in the film by evaporating the organic solvent and the droplets.

In a preferred embodiment of the present invention, when surface temperature of the film is TL($°$ C.) in forming the droplets in the film, the film is advanced to a first zone in which a dew point is TD1($°$ C.) and the following condition is satisfied: $TD1-TL \geqq 0°$ C., and passed through the first zone. In addition, the following condition is satisfied in the first zone: $80° C. \geqq TD1-TL$. The water in air, which is sent to the film, is condensed to form the droplets in the first zone, relative speed of the air and the film being advanced is no less than 0.1 m/s and no more than 20 m/s. The film after being passed through the first zone is advanced to a second zone in which a dew point is TD2($°$ C.) and the following condition is satisfied: $TL-TD2 \geqq 1°$ C., and passed through the second zone. In addition, the following condition is satisfied in the second zone: $80° C. \geqq TL-TD2$. A time when the film passes through the first zone is adjusted within a range of 0.1 seconds to 100 seconds, so that condition of the voids is adjusted. A feeding angle of the film in the first zone is within $\pm 10°$ to a horizontal direction. Cleanness of the air in the first and/or second zone is no more than class 1000. The film is a honeycomb-structure film. TL is no less than $0°$ C. Temperature of the support is kept at no less than $0°$ C. and at lower than a boiling point of the organic solvent. Variation of TL in a width direction of the support is within $\pm 3°$ C. When the support is formed by an endless member, only the film is peeled from the endless member. Meanwhile, when the support is formed by a flexible member, only the film is peeled from the flexible member. The flexible member is formed by the polymer compound, and has a property of absorbing a part of the organic solvent. The liquid is cast by at least one of a slide method, an extrusion method, a bar method, and a gravure method. The film is dried by a decompression drying method and/or a 2D nozzle method. At least one of ultraviolet ray and electron ray is irradiated to the film.

In a preferred embodiment of the present invention, a flexible web is advanced by a rotating support; a coating layer is formed by applying a liquid including an organic solvent and a polymer compound on the web; droplets are formed in the coating layer; and a large number of voids in the coating layer are formed by evaporating the organic solvent and the droplets.

In a preferred embodiment of the present invention, droplets made from a material which is different from the liquid including the organic solvent and the polymer compound are formed on the film. The droplets are evaporated after evaporating the organic solvent from the film to form the plural voids in the film.

According to the producing method for the film of the present invention, the droplets are formed in the film, and then the droplets or the organic solvent are/is evaporated, so that the film having a large size can be easily produced. When the surface temperature of the film is TL ($°$ C.), the film is passed through the first zone in which the dew point is TD1 ($°$ C.) and the following condition is satisfied: $TD1-TL \geqq 0°$ C., so that the droplets can be formed uniformly. Thereby, the film having the uniform voids can be produced.

In the first zone, when the water in the air sent to the film is condensed to form the droplets, the relative speed of the blowing speed of the air and the moving speed of the film is no less than 0.1 m/s and no more than 20 m/s, so that the droplets can be produced at low cost, and in addition the film can also be produced at low cost. After the film was passed through the first zone, the film is passed through the second zone in which the dew point is TD2 ($°$ C.) and the following condition is satisfied: $TL-TD2 \geqq 1°$ C., so that the evaporation of the droplets is easily controlled to produce the film having the intended voids.

According to the producing method for the film of the present invention, the void of the film is formed into the honeycomb structure. The film is preferably used as a base material of a biotip, for example.

According to the producing method for the film of the present invention, when the endless member is used in the support, only the film is peeled from the endless member, so that the film of approximately the same quality can be continuously produced. Meanwhile, when the flexible member formed by the polymer compound is used as the support, the part of the organic solvent is absorbed by the flexible member, so that the intended film can be produced.

BRIEF DESCRIPTION OF DRAWINGS

FIG. 5 is a schematic view of the relevant portion of a film-producing apparatus in another embodiment;

BEST MODE FOR CARRYING OUT THE INVENTION

Figure 1:
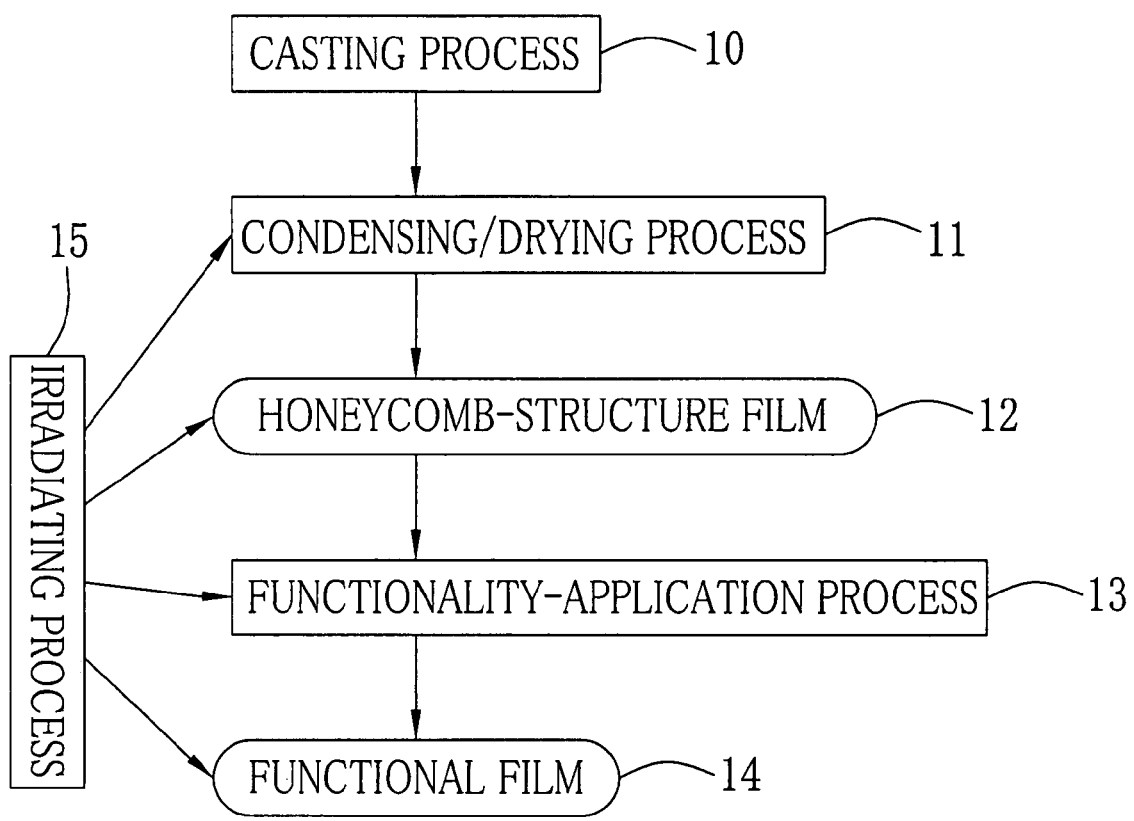
FIG. 1 is a flow chart for showing process for a producing method for a film of the present invention.

In FIG. 1, a polymer solution is cast on a support according to a casting process 10 to form a casting film. Next, water in air is condensed to be contained in the casting film as a micro-water droplet (hereinafter referred to as a droplet) according to a condensing/drying process 11. After that, a solvent of the polymer solution and the droplets are evaporated to obtain a honeycomb-structure film 12. In a functionality-application process 13, a functional material is applied on/in the honeycomb-structure film 12 to obtain a functional film 14. Ultraviolet ray and electron ray may be irradiated to the casting film and the honeycomb-structure film 12 in an irradiating process 15 while the functional film 14 is obtained from the casting film.

A polymer compound is contained in the honeycomb-structure film 12 as a major component. Although the polymer compound can be determined according to the purposes, it is preferable to use the polymer compound (hereinafter referred to as a lipophilic polymeric compound to be solved in a water-insoluble solvent), that is a hydrophobic solvent, such as poly-.ε.-caprolactone, poly-3-hydroxybutyrate, agarose, and poly-2-hydroxyethylacrylate, polysulfone. Especially, poly-.ε.-caprolactone, which is easily obtained at low cost, is preferably used. In addition, poly-.ε.-caprolactone is preferably used when biodegradability is required.

The lipophilic polymeric compound can be appropriately selected from among the well-known lipophilic polymeric compounds according to the purposes. For example, there are vinyl polymerized polymer (e.g. polyethylene, polypropylene, polystyrene, polyacrylate, polymethacrylate, polyacrylamide, polymethacrylamide, polyvinylchloride, polyvinylidene chloride, polyvinylidene fluoride, polyhexafluoropropene, polyvinylether, polyvinylcarbazole, polyvinyl acetate, and polytetrafluoroethylene), polyester (e.g. polyethylene terephthalate, polyethylene naphthalate, polyethylene succinate, polybutylene succinate, and polylactic acid), polylactone (e.g. polycaprolactone), polyamide or polyimide (e.g. nylon and polyamic acid), polyurethane, polyurea, polycarbonate, polyaromatics, polysulfone, polyether sulfone, polysiloxane derivatives, and so forth. In view of solubility, electrical and optical properties, film strength, and elasticity, the above lipophilic polymeric compounds may be homopolymerized, copolymerized, or mixed as polymer blend according to need. Note that two or more of the above polymer compounds may be mixed according to need.

Although the honeycomb-structure film 12 can be formed only by the lipophilic polymeric compound, an amphiphilic material is preferably added to the lipophilic polymeric compound, particularly an amphiphilic polymer compound including amphiphilic polyacrylamide. The mixing ratio between the lipophilic polymeric compound and the amphiphilic polymer compound is preferably a weight ratio from 5:1 to 20:1.

The amphiphilic polymer compound can be selected according to the purposes. As examples of the amphiphilic polymer compound, there are the amphiphilic polymer compound constituted of a dodecyl group as a lipophilic side chain, a carboxyl group as a hydrophilic side chain and polyacrylamide as the main chain structure, and polyethyleneglycol/polypropyleneglycol block copolymer. The lipophilic side chain is a nonpolar linear group such as an alkylene group and a phenylene group, and preferably has a structure in which the hydrophilic side chain such as a polar group and an ionic dissociation group is not branched until the terminal except for a linking group such as an ester group and an amide group. The lipophilic side chain is preferably constituted of five or more methylene units when the alkylene group is used for example. The hydrophilic side chain preferably has a structure in which there are a hydrophilic portion such as the polar group and the ionic dissociation group in the terminal through a linking portion such as the alkylene group.

Since the ratio between the lipophilic side chain and the hydrophilic side chain differs according to the size, the strength of the nonpolar and polar characters, the strength of hydrophobic property of the organic solvent, and so forth, the ratio is not completely specified. However, the ratio of the units (lipophilic side chain/hydrophilic side chain) is preferably 3/1-1/3. In the case of the copolymer, it is more preferable to use the block copolymer in which the lipophilic side chain and the hydrophilic side chain form the blocks without decreasing solubility to hydrophobic solvent than alternating polymer of the lipophilic side chain and the hydrophilic side chain.

The number-average molecular weight (Mn) of the lipophilic polymeric compound and the amphipathic polymer is preferably 1,000-10,000,000, particularly 5,000-1,000,000.

The lipophilic polymeric compound and the amphiphilic polymer compound may be a polymerizable (cross-linking) polymeric compound having a polymerizable group in the molecules. Polymerizable multifunctional monomer is mixed with the lipophilic polymeric compound and the amphiphilic polymer compound. After forming a honeycomb film by mixing, the mixture material may be hardened by the well-known method using heat, ultraviolet ray, electron ray, and so forth.

As the multifunctional monomer used with the lipophilic polymeric compound and the amphiphilic polymer compound, it is preferable to use multifunctional (meta)acrylate in view of the reactivity. As examples of the multifunctional (meta)acrylate, there are dipentaerythritol pentaacrylate, dipentaerythritol hexaacrylate, dipentaerythritol caprolactone addition hexaacrylate, or modified compounds of them, epoxyacrylate oligomer, polyester acrylate oligomer, urethane acrylate oligomer, N-vinyl-2-pyrrolidone, tripropylene glycol diacrylate, polyethylene glycol diacrylate, trimethylolpropane triacrylate, pentaerythritol triacrylate, pentaerythritol tetraacrylate, or modified compounds of them. One or more than two sorts of these multifunctional monomers are used in view of the balance between the flexibility and the scratch resistance. When the lipophilic polymeric compound and the amphiphilic polymer compound are the polymerizable (cross-linking) polymeric compounds having the polymerizable group in the molecules, the polymerizable multifunctional monomer reactable with the polymerizable group is preferably used with the polymerizable polymeric compound.

In the above multifunctional monomers, the monomer having an ethylene type unsaturated group can be polymerized by irradiating of ionizing radiation or heating under the presence of a photoradical initiator or a thermal radical initiator. For instance, a coating liquid containing the monomer having the ethylene type unsaturated group, the photoradical initiator or the thermal radical initiator, matting particles, and inorganic filler is prepared. After the coating liquid is applied on a transparent support, it is hardened by polymerization reaction caused by the ionizing radiation or heat, so that an antireflection film can be produced.

As a radical photopolymerization initiator, there are acetophenones, benzoins, benzo phenones, phosphineoxides, ketals, anthraquinones, tioxanthones, azo compounds, peroxides, 2,3-alkyl dion compounds, disulfide compounds, fluoroamine compounds, and aromatic sulfoniums, for example.

As the acetophenones, there are 2,2-ethoxyacetophenone, p-methylacetophenone, 1-hydroxydimethyl phenyl ketone, 1-hydroxy cyclohexyl phenyl ketone, 2-methyl-4-methylthio-2-molpholinopropiophenone, 2-benzyl-2-dimethylamino-1-(4-morpholinophenyl)-butanone, for example.

As the benzoins, there are benzoin benzenesulfonic ester, benzoin toluenesulfonic ester, benzoin methyl ether, benzoin ethyl ether, and benzoin isopropyl ether, for example.

As the benzophenones, there are benzophenone, 2,4-chlorobenzophenone, 4,4-dichlorobenzophenone, and p-chlorobenzophenone, for example.

As the phosphineoxides, there is 2,4,6-trimethylbenzoyl-diphenylphosphine oxide, for example.

Various examples of the radical photopolymerization initiator are described in "Saishin UV-Koka Gijutsu (New UV Curing Technology)" page 159, published by Kazuhiro TAKABO; publishing company, Technical Information Institute CO., Ltd, 1991. As a preferable example of a commercial photocleavage-type radical photopolymerization initiator, there is Irgacure (651,184,907) from Chiba Specialty Chemicals CO., Ltd. The photopolymerization initiator is preferably used within the range of 0.1-15 mass pct. to 100 mass pct. of the multifunctional monomer, particularly 1-10 mass pct. A photosensitizer may be used in addition to the photopolymerization initiator. As the example of the photosensitizer, there are n-butylamine, triethylamine, tri-n-butyl phosphine, Michler's ketone, thioxanthone, and so forth.

As the thermal radical initiator, organic peroxide, inorganic peroxide, organic azo compound, and organic diazo compound can be used for example. As the organic peroxide, there are benzoyl peroxide, halogen benzoyl peroxide, lauroyl peroxide, acetyl peroxide, dibutyl peroxide, cumene hydro peroxide, and butyl hydro peroxide, for example. As the inorganic peroxide, there are hydrogen peroxide, ammonium persulfate, and potassium persulfate, for example. As the azo compound, there are 2,2'-azobis(isobutyronitrile), 2,2'-azobis(propionitrile), and 1,1'-azobis(cyclohexanecarbonitrile), for example. As the diazo compound, there are diazoaminobenzene, and p-nitrobenzenediazonium, for example.

As the solvent for dissolving the polymer compound to prepare the polymer solution, there are chloroform, dichloromethane, carbon tetrachloride, cyclohexane, methyl acetate, and the like. However, if the solvent can dissolve the polymer compound, the solvent is not limited especially. Polymer concentration upon casting may be within the range capable of forming the casting film, specifically the range of no less than 0.1 wt % and no more than 30 wt %. If the polymer concentration is less than 0.1 wt %, it is not possibly much suitable for the productivity of the film and the industrial mass-production. Meanwhile, in the condensing/drying process 11, since the polymer concentration is more than 30 wt %, the casting film is dried before the growth of the droplet becomes enough, it possibly becomes difficult to form the honeycomb structure having the void of favorable size.

Figure 2:
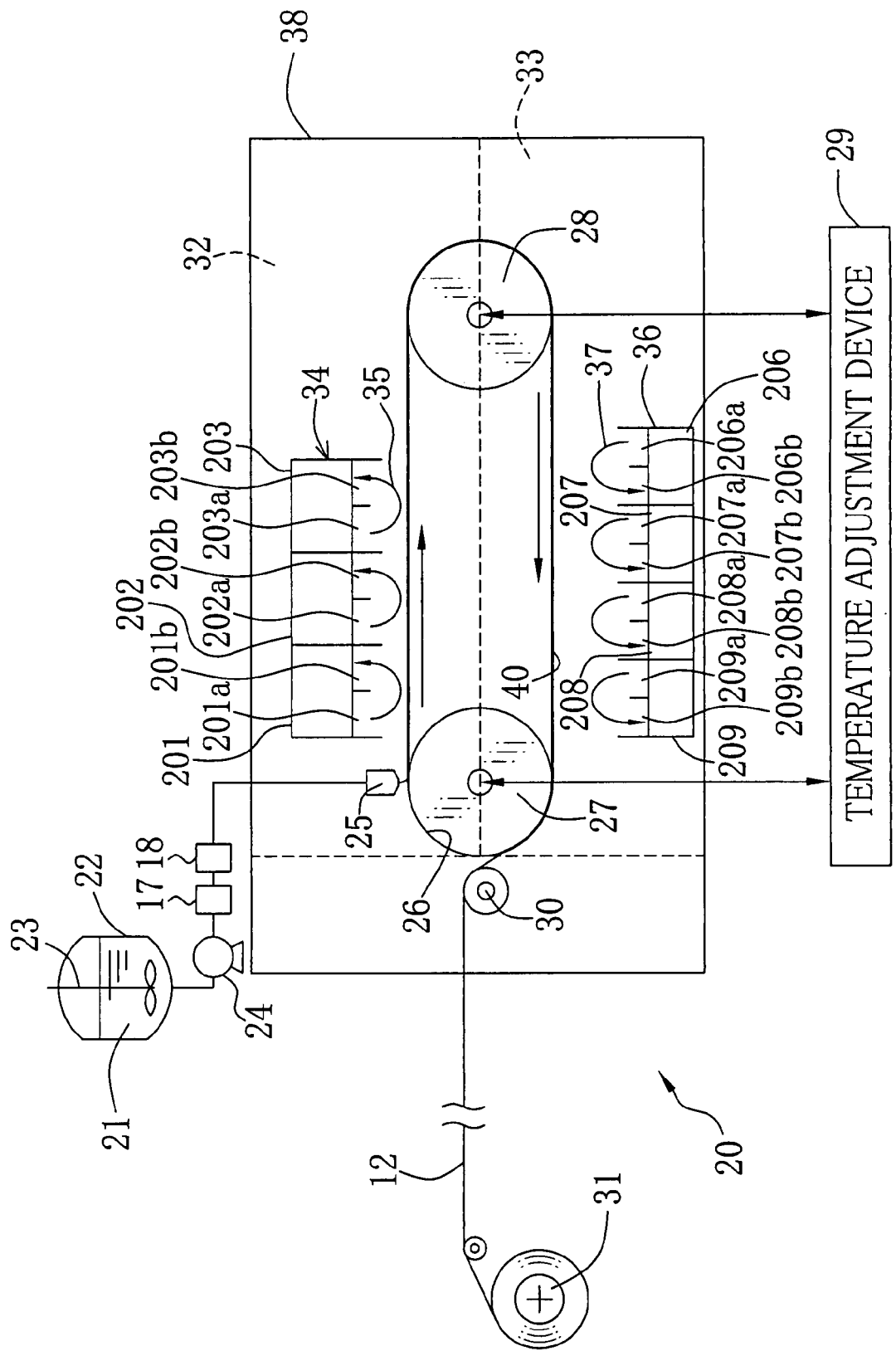
FIG. 2 is a schematic view of a film-producing apparatus.

In a film-producing apparatus 20 shown in FIG. 2, a polymer solution 21 is contained in a tank 22. A stirrer 23 having a stirrer blade is provided in the tank 22. The polymer solution 21 is uniformly mixed by rotating the stirrer blade. The polymer solution 21 is sent to a casting die 25 through a pump 24.

The polymer solution 21 is pre-filtered before being sent to the casting die 25, so that it is possible to prevent foreign matters from mixing in the film. The filtering is performed by a first filtering device 17 and a second filtering device 18. When the plural filtering devices can be provided, the first filtering device 17 disposed on an upstream side is preferably provided with a filter having absolute filtering accuracy (absolute filtering hole diameter) which is larger than a diameter of the void of the honeycomb-structure film 12; meanwhile, the second filtering device 18 disposed on a downstream side is preferably provided with a filter having the absolute filtering accuracy which is smaller than the void of the honeycomb-structure film 12.

The gel-like foreign matters can be removed over long periods by using the first filtering device 17. The small gel-like foreign matters, aggregated powder, impurities, and the like can be removed by using the second filtering device 18. As the filtering hole diameter becomes smaller, the smaller foreign matters can be removed; however, if only the filter of which hole diameter is small is used, the life of the filter is shortened. Thus, the filtering is performed by the filter having the smaller hole diameter after the filter having the larger hole diameter, so that the life of the filter having the smaller hole diameter can be lengthened. The absolute hole diameter of the filter is selected on the basis of the size of the void of the honeycomb-structure film 12. Thereby, there are effects of being able to remove the foreign matters inhibiting the formation of the regular structure in the honeycomb-structure film 12, and to obtain the honeycomb-structure film 12 in which the uniform voids are regularly arranged. Note that the solvent before being mixed with the polymer compound may be filtered by the filtering device similar to the first and second filtering devices 17, 18.

The casting die 25 is provided above a casting belt 26. The casting belt 26 is bridged across rotatable rollers 27, 28. The rotatable rollers 27, 28 are rotated by a driving device (not shown) to run the casting belt 26 continuously around these rollers. The temperature of the rotatable rollers 27, 28 is adjusted by a temperature adjustment device 29 to control the temperature of the casting belt 26 contacting with each roller. The film-producing apparatus 20 is provided with a peeling roller 30 and a winder 31. The peeling roller 30 supports the honeycomb-structure film 12 peeled from the casting belt 26 upon peeling the casting film 40 on the casting belt 26. The honeycomb-structure film 12 is wound by the winder 31.

Figure 3A:
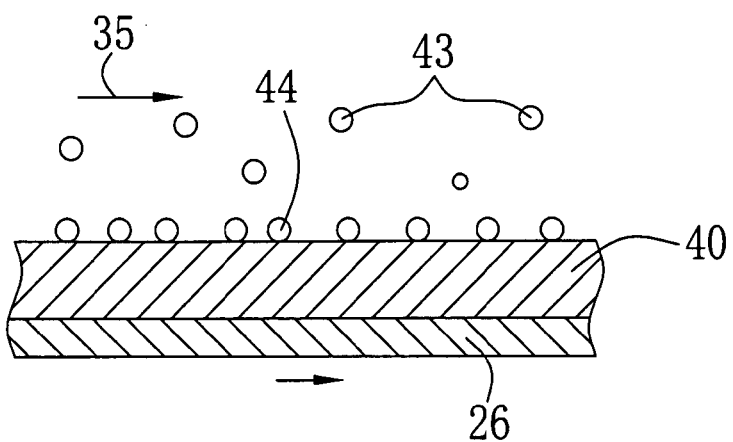
FIGS. 3A, 3B, 3C, and 3D are explanatory views showing a process for forming the film.

In the casting process 10, the polymer solution 21 is cast on the casting belt 26 from the casting die 25. And then the condensing/drying process 11 is performed. As shown in FIG. 3A, the casting film 40 is formed on the casting belt 26. The surface temperature TL (° C.) of the casting film 40 (hereinafter referred to as a film-surface temperature) is preferably no less than 0° C. If TL is less than 0° C., the void having the intended size and condition may not be formed due to the solidification of the droplet in the casting film 40.

A casting chamber 38 in which the casting is performed is divided into a condensation zone 32 and a drying zone 33. In the condensation zone 32, the droplets are generated on the casting film 40, and then grown. In the drying zone 33, the solvent and the droplets are evaporated in order to form the voids in the casting film 40. The casting film 40 is passed through these zones 32, 33, so that it is self-organized to become the film having the void with a predetermined condition. A blowing and suctioning device 34 provided in the condensation zone 32 sends air 35 to the casting film 40 on the casting belt 26 and sucks the air 35. The blowing and suctioning device 34 is provided with a controller (not shown) for controlling independently air temperature, humidity, air flow volume and suction power. These conditions are controlled by the controller 204, so that the condensing condition is also controlled. The growth of the droplet means that: the droplet becomes larger; the size of the droplets is uniformed; and the number of droplets is increased to be formed minutely and densely in spite of change in the size thereof. The blowing and suctioning device 34, which is an air supply system for blowing the air and provided with air-blowing openings and the suctioning openings, controls the temperature of the air and the dew point. The air-blowing openings are provided with a filter for keeping cleanness level of the air. The suctioning openings discharge the air. As shown in FIG. 2, the blowing and suctioning device 34 is constituted of air-blowing and suctioning units 201, 202 and 203 having air-blowing openings 201a, 202a and 203a and suctioning openings 201b, 202b and 203b. The airs from the air-blowing openings 201a, 202a and 203a are respectively sucked or discharged through each suctioning opening 201b, 202b and 203b. Therefore, the condensing condition, namely the generation and the growth of the droplets, is controlled along an advancing direction of the casting film 40, so that the growth of the droplet can be easily controlled.

The blowing and suctioning device 34 may be a unified type having the plural air-blowing openings and suctioning openings. Alternatively, as shown in FIG. 2, the plural air-blowing units 201-203 constituted of the air-blowing openings 201a-203a and a suctioning openings 201b-203b may be arranged along the advancing direction of the casting film 40. The controller 204 controls the air-blowing and suctioning units 201-203 separately. Thereby, the air-blowing and the suctioning are controlled in response to the generation and growth of the droplet. In addition, the air-blowing opening and suctioning opening are respectively divided into plural areas in the width direction of the casting film, so that an air-blowing and suctioning unit capable of controlling the air-blowing and the suctioning every each area may be used. Thereby, the condensation in the width direction of the casting film 40 can be controlled. Although the three air-blowing and suctioning units are integrated in the blowing and suctioning device 34, the type of the air blower including the number of the air-blowing and suctioning unit is not limited.

An dryer 36 is provided in the drying zone 33. The dryer 36 sends drying air 37 to the casting film 40 and sucks the drying air 37. As well as the blowing and suctioning device 34, the dryer 36, which is the air supply system for blowing the air and provided with the air-blowing openings and the suctioning openings, controls the temperature of the air and the dew point. The air-blowing openings are provided with a filter for keeping the cleanness level of the air. The suctioning openings discharge the air. Specifically, the dryer 36 is provided with air-blowing and suctioning units 206, 207, 208 and 209 constituted of air-blowing openings 206a, 207a, 208a and 209a, and suctioning openings 206b, 207b, 208b and 209b. Therefore, drying condition of the casting film 40 can be easily controlled.

When the casting film 40 enters the drying zone 33, the growth of the droplet is stopped. Subsequently, the droplet is made to evaporate after evaporating the organic solvent. The evaporation speed of the organic solvent is preferably faster than the droplet at the same temperature and pressure. Even though the evaporation speeds of the organic solvent and the droplet are the same, if the droplet has stronger affinity for the polymer compound than the organic solvent, or if the organic solvent of which intermolecular force is weaker than the droplet 44 is used, it is possible to obtain an effect similar to the effect that the droplet 44 and organic solvent are made to be evaporated in the above order. Thereby, the droplet more easily enters the inside 25, of the casting film 40 in accordance with the evaporation of the organic solvent. Although it is preferable that the droplet is started to be evaporated after the organic solvent is evaporated completely, the droplet may be started to be evaporated at the time when about 0.1-30% of the organic solvent contained in the casting film 40 is evaporated.

The dryer 36 is constituted of four air-blowing and suctioning units 206-209; however, the number thereof is not limited. The dryer 36 is provided with a controller (not shown) for controlling independently temperature of the drying air 37, humidity, air flow volume and suction power of the air-blowing and suctioning units 206-209. Although the dryer 36 is constituted of the plural air-blowing and suctioning units, it may be a unified type having the plural air-blowing openings and suctioning openings. Alternatively, the air-blowing opening and suctioning opening are respectively divided into plural areas in the width direction of the casting film, so that the air-blowing and suctioning unit capable of controlling the air-blowing and the suctioning every each area arranged in the width direction may be used. Thereby, the evaporation condition of the solvent and the droplet in the width direction of the casting film can be controlled.

The temperature of the casting belt 26 is preferably adjusted through the rotatable rollers 27, 28 by using the temperature adjustment device 29, or it may be adjusted by sending a heat transferring medium the temperature of which is adjusted to a liquid flow path provided in the rotatable rollers 27, 28. The lower limit of the temperature of the casting belt 26 is preferably no less than 0° C. Meanwhile, the upper limit thereof is preferably no more than a boiling point of the organic solvent, particularly (the boiling point−3)° C. Thereby, the condensed water is not solidified, and in addition, rapid evaporation of the solvent in the cast film 40 is controlled, so that it is possible to obtain the honeycomb-structure film 12 excellent in the size of the void, the uniformity, and the shape. Moreover, the variation of the temperature of the casting belt 26 across the width direction of the casting film 40 is set within ±3° C., so that the variation of the surface temperature TL of the casting film 40 depending on the positions in the width direction can also be set within ±3° C. The temperature variation of the casting film 40 in the width direction is reduced, so that generation of anisotropy in the void of the honeycomb structure 12 is prevented. As a result, the commercial value of the film is enhanced.

If the inclination of the advancing path until reaching the condensation zone 32 is too large, in the inside of the casting film 40 the liquid constituting the casting film 40 may flow nonuniformly to an inclination direction of an advancing path of the casting belt 26 (hereinafter referred to as liquid flow phenomenon). In order to prevent the liquid flow phenomenon, the advancing path is preferably set within ±10° to the horizontal direction. Note that the advancing path is preferably set within ±10° to the horizontal direction not only in an advancing direction of the advancing path, but also in the width direction thereof. The thickness of the casting film 40 is uniformed by adjusting the inclination of the advancing direction and the width direction of the advancing path, so that the uniform honeycomb structure can be formed. Since the liquid flow phenomenon may also occur in the casting film 40 in the condensation zone 32, the advancing path in the condensation zone 32 is also preferably set within ±10° to the horizontal direction.

At least one of a dew point TD1 (° C.) of the air 35 from the blowing and suctioning device 34 and surface temperature TL (° C.) of the casting film 40 passing through the condensation zone 32 is controlled so as to satisfy the following condition: $0°C. \leq (TD1-TL)$, so that the water vapor in the air 35 flowing in the vicinity of the casting film 40 can be changed into the intended droplet, and in addition, it is possible to grow the droplet favorably. TD1 and TL preferably satisfy the following condition: $0°C. \leq (TD1-TL) \leq 80°C.$, particularly $0°C. \leq (TD1-TL) \leq 30°C.$, especially $0°C. \leq (TD1-TL) \leq 10°C.$ If (TD1-TL) is less than 0° C., the condensation may be difficult to occur, and to make matters worse, the growth of the droplet may be irregular. If (TD1-TL) is more than 80° C., since the speed of the condensation, namely the generation speed of the droplets becomes too higher, extra droplets are generated above the original droplets, so that the size of the voids of the honeycomb-structure film 12 may become uneven, that is the structure itself may become uneven. Although the temperature of the air 35 is not limited, it is preferably within a range of 5° C. to 100° C. If the temperature is more than 100° C., the droplet may be evaporated as the water vapor before entering into the casting film 40.

Variation of the surface temperature TL of the casting film 40 immediately before the casting film 40 enters the condensation zone 32, the dew point in the vicinity of the advancing path immediately before the condensation zone 32, and the dew point in the vicinity of the advancing path immediately after the condensation zone 32 is preferably within ±3° C.

Figure 3B:
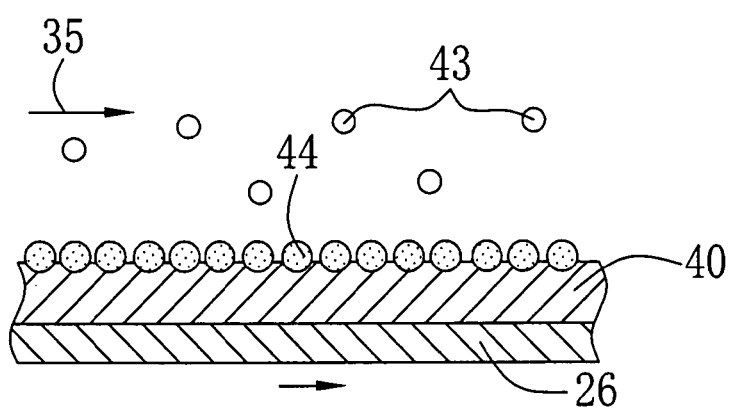
Figure 3C:
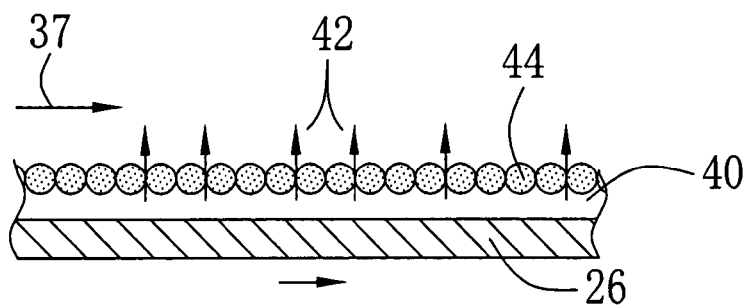

As shown in FIG. 3A, water 43 in the air 35 is condensed on the casting film 40 in the condensation zone 32 to become the droplet 44. Then, as shown in FIG. 3B, the water 43 is condensed with the droplet 44 as a core, to make the droplet 44 grow. The organic solvent is really started to be evaporated immediately after casting. The evaporation speed of the organic solvent is controlled in response to the temperature of the casting belt 26 and the atmosphere temperature, and at the same time, the surface temperature TL of the casting film 40 is set at a predetermined temperature to be entered in the condensation zone 32. As shown in FIG. 3C, if the drying air 37 is sent to the casting film 40 in the drying zone 33, the organic solvent 42 is evaporated from the casting film 40. At this time, although the droplet 44 is evaporated with the organic solvent 42, the organic solvent 42 is evaporated faster than the droplet 44, so that the plural droplets 44 have approximately uniform shape due to surface tension with the evaporation of the organic solvent 42, and in addition, enter into the casting film 40. The droplet 44 may enter into the casting film 40 with growing.

Figure 3D:
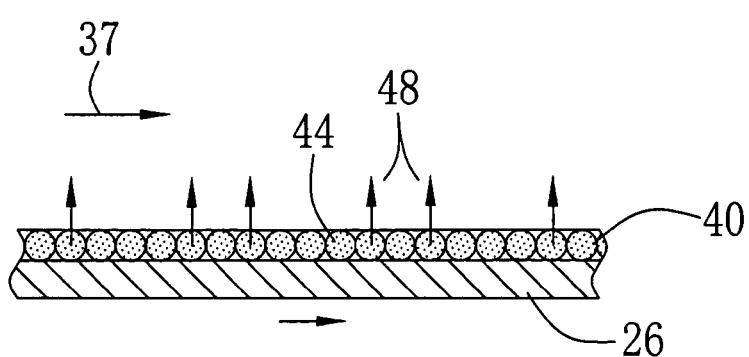
Figure 4A:
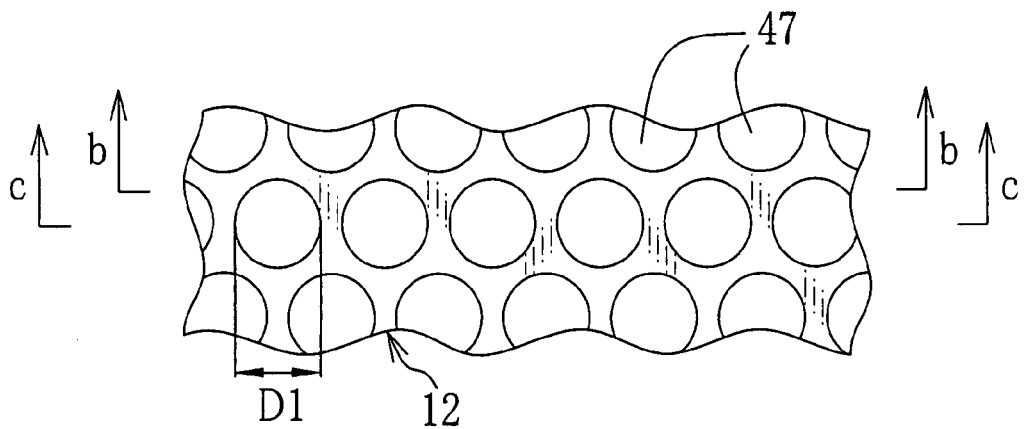
FIG. 4A is a plan view of the film.
Figure 4B:
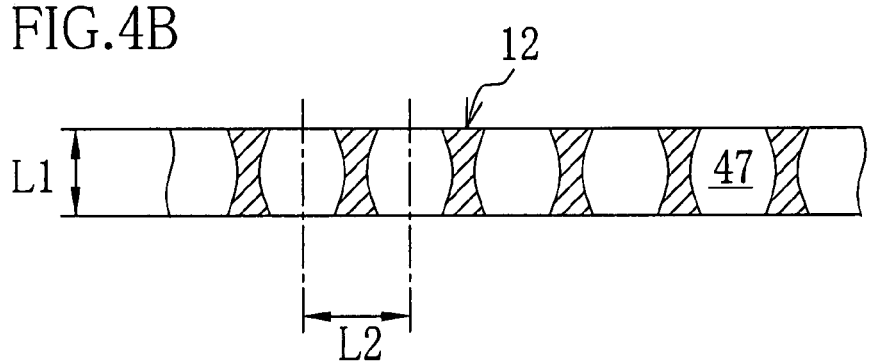
FIG. 4B is a cross-sectional view along line b-b of FIG. 4A.
Figure 4C:
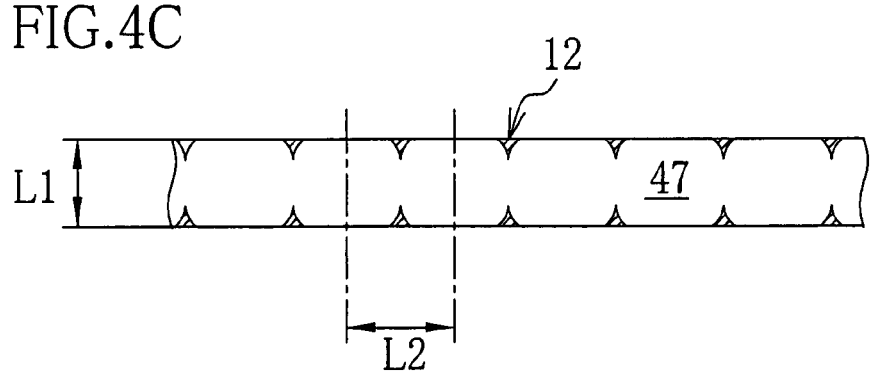
FIG. 4C is a cross-sectional view along line c-c of FIG. 4A.
Figure 4D:
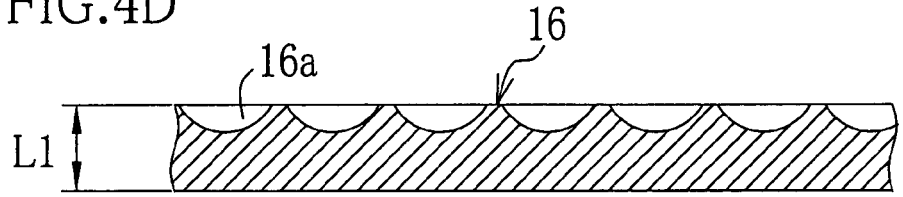
FIG. 4D is a plan view of a film in another embodiment.

After the casting film 40 is further dried, the droplet 44 is evaporated as the water vapor 48 as shown in FIG. 3D. As shown in FIG. 4, after the droplet 44 evaporates from the casting film 40, the area where the droplets 44 occupy becomes the void 47 to obtain the honeycomb-structure film 12. Here, the honeycomb-structure film 12 represents a structure in which a large number of small voids are formed in the film. The voids 47 are formed in the inside of the honeycomb-structure film 12 in a honeycomb manner as shown in FIG. 4A. The voids 47 may be formed so as to penetrate the both surfaces of the honeycomb-structure film 12 as shown in FIGS. 4B and 4C; meanwhile, they may be formed as a concave portion 16a in one side of a honeycomb-structure film 16 as shown in FIG. 4D. Note that the plan view of the honeycomb-structure film 16 in FIG. 4D is omitted, since it is similar to FIG. 4A. The arrangement of the voids 47 is changed depending on the degree of roughness and fineness of the droplets, the size thereof, the kind of the droplet, the drying speed, and so forth. The shape of the honeycomb-structure film is not limited; however, in the present invention, for example, the honeycomb-structure film in which the center-to-center distance L2 between two adjacent voids 47 is no less than 0.05 μm and no more than 100 μm is produced effectively.

The honeycomb structure in the honeycomb-structure film 12 formed by self-organizing the casting film represents the structure in which the voids having a constant shape and size are continuously and regularly arranged as above-mentioned. Such regular arrangement is two-dimensional when the structure is constituted of a single layer. In many cases, plural voids (e.g. six (6) voids) are arranged so as to surround one void. Meanwhile, the structure has three-dimensional regularity when it is constituted of plural layers. In many cases, the structure is closest packed structure such as face-centered cubic structure and hexagonal structure which are crystal structure. However, the honeycomb structure in the present invention has other regularity according to the producing condition.

The thickness of the honeycomb-structure film 12 is preferably D1 (hole diameter)—200 μm. A thicker portion where voids are not formed can be formed on the support side. In this case, the thickness of the thicker portion is preferably 1-500 μm.

The air 35 is preferably supplied at an angle within ±20° to the casting film 40, especially supplied as the following wind (concurrent flow) parallel to the casting film 40. If the air 35 is sent as countercurrent flow, it is difficult to control blowing speed of the air 35 when the relative speed of the air 35 and the casting film 40 is low, so that the exposure surface of the casting film 40 is disturbed to lose the smoothness. Thereby, the growth of the droplet 44 is possibly inhibited. The relative speed of the blowing speed of the air 35 and the moving speed of the casting film 40, that is an advancing speed of the casting belt 26 is preferably no less than 0.1 m/s and no more than 20 m/s, particularly no less than 0.5 m/s and no more than 15 m/s, especially no less than 1 m/s and no more than 10 m/s. If the relative speed is less than 0.1 m/s, the casting film 40 is possibly advanced to the drying zone 33 before the droplets 44 are formed to be arranged minutely and densely. If the relative speed is more than 20 m/s, the exposure surface of the casting film 40 is possibly disturbed, and in addition, the condensation may not advance enough.

The variation of the relative speed is preferably within ±20% to the average value of the relative speed. Such condition and the condition of the air uniform the condition of the droplet 44 effectively. The relative speed can be adjusted by adjusting at least one of the blowing speed of the air 35 and the advancing speed of the casting film 40.

In the present invention, the time when the casting film 40 passes through the condensation zone 32 is preferably no less than 0.1 seconds and no more than 100 seconds. Thereby, it is possible to generate uniformly a large enough number of the droplets 44 to fill the voids minutely and densely. If the passing time is less than 0.1 seconds, since the void is formed without the droplet 44 growing enough, it may be difficult to obtain the intended void, or the minute voids may not be formed in the film. If the passing time is more than 100 seconds, since the size of the droplet 44 becomes too large, the honeycomb-structure film is not possibly obtained. The time when the casting film 40 passes through the condensation zone 32 is controlled, so that the condition of the void including the size can be controlled. When the honeycomb-structure film 12 is not produced continuously, but produced by a batch method, or formed into a sheet or a small strip, the time when the casting film 40 is condensed is controlled instead of the time when the casting film 40 passes through the condensation zone 32, so that the condition of the void can be controlled.

The blowing speed of the drying air 37 for drying the casting film 40 in the drying zone 33 is no less than 0.1 m/s and no more than 20 m/s, particularly no less than 0.5 m/s and no more than 15 m/s, especially no less than 1 m/s and no more than 10 m/s. If the blowing speed is less than 0.1 m/s, the evaporation of the droplet 44 may not advance enough, and thus, the productivity is possibly lowered. If the blowing speed is more than 20 m/s, the droplet 44 is rapidly evaporated, so that the shape of the void 47 may be disturbed.

At least one of a dew point TD2 (° C.) of the drying air 37 and the surface temperature TL (° C.) is preferably controlled so as to satisfy the following condition: (TL−TD2)≧1° C. Thereby, it is possible to evaporate the droplet 44 as the water vapor 48 after stopping the growth of the droplet 44. If the difference between TL and TD2 (TL−TD2) is less than 1° C., the growth of the droplet 44 can not be surely stopped, so that the accuracy of the size of the void 47 may be lowered. In the drying zone 33, it is more preferable to satisfy the following condition: 80° C.≧(TL−TD2). If the difference between TL and TD2 (TL−TD2) is over 80° C., the organic solvent and the droplets 44 are rapidly evaporated, so that the arrangement, shape, and size of the droplets 44, which have been arranged regularly, are disturbed to prevent the uniform honeycomb structure from developing.

Variation of the surface temperature TL of the casting film 40 immediately before the casting film 40 enters the drying zone 33, the dew point in the vicinity of the advancing path immediately before the drying zone 33, and the dew point in the vicinity of the advancing path immediately after the drying zone 33 is preferably within ±3° C.

The casting film 40 can be dried by a decompression drying method instead of or in addition to the dryer 36 having a 2D nozzle (two-dimensional nozzle). In the decompression drying method, the evaporation speed of the organic solvent 42 and the droplet 44 can be controlled. Thereby, it is possible to form the droplet 44 in the casting film 40 favorably after the organic solvent 42 and the droplet 44 are evaporated, so that the void 47 of which the size and the shape are controlled can be formed in the position where the droplet 44 exists. Note that the 2D nozzle is constituted of an air supply nozzle member for blowing air and an air discharge nozzle member for sucking air in the vicinity of the casting film 40. It is preferable to use the 2D nozzle in which the blowing and the suctioning can be uniformly performed over the full width of the cast surface. The difference between the dew point of the air and the surface temperature TL of the casting film is set within 80° C., so that it is possible to prevent the organic solvent and/or the water from evaporating rapidly to obtain the honeycomb structure film 12 having the intended shape.

In addition, a condenser in which a groove is formed on the surface may be provided at a position apart from the film surface by a distance about 3 mm-20 mm. The surface of the condenser is cooled, and the water vapor and a volatile organic solvent are condensed by the cooled surface to prevent the water in the vicinity of the film surface and the concentration of solvent gas from becoming higher, so that the casting film is dried. A dynamic influence on the film surface of the casting film 40 can be reduced to dry the film surface by applying at least one of the above drying methods, so that the smoother film surface can be obtained.

The number of air-blowing and suctioning units of the blowing and suctioning device 34 and the dryer 36 is changed, or the interior of the blowing and suctioning device 34 and the dryer 36 is divided into the plural areas, so that the different condensing and drying conditions can be determined every unit or area. Thereby, dimensional controllability and the uniformity of the void 47 can be improved. Although the number of the air-blowing and suctioning units and the area is not limited, the optimum combination is determined in view of the quality of the film and the cost of the facility.

In the present invention, the difference between the temperature of the dew point TDn (° C.) (n represents 1 or 2) in the condensation zone 32 or the drying zone 33 and the surface temperature TL (° C.) preferably satisfies the following condition: |TDn−TL|≦80° C. Thereby, it is possible to prevent the organic solvent and/or the water from evaporating rapidly to obtain the honeycomb-structure film 12 having the intended shape.

If impurities are mixed in the casting film 40, the forming of the honeycomb structure is inhibited. Thus, the air-blowing openings 201a, 202a, 203a, 206a, 207a, 208a, and 209a preferably have the cleanness level of class 1000 or less. A filter (not shown) for removing dusts and the like in the air supply system is preferably provided in each unit of the blowing and suctioning device 34 and the dryer 36 to air-condition the inside of the housing 38. Thereby, the possibility of the mixing of the impurities into the casting film 40 is reduced, so that the favorable honeycomb-structure film 12 can be obtained.

When viscosity of the casting film 40 is represented as N1, and the viscosity of the droplet 44 is represented as N2, it is preferable that the following condition is satisfied: N1<N2 until the void is expected to be formed in the drying zone 33 such that the condition thereof becomes favorable after the droplets 44 has been started to be formed in the condensation zone 32. Thereby, the droplets 44 enter into the casting film 20, so that it is possible to obtain the honeycomb-structure film 12 in which the voids are formed more uniformly. The easiest method satisfying the above viscosity condition is to previously prepare the polymer solution 21 such that the viscosity is relatively low. Even if the polymer solution 21 is prepared such that the viscosity of the casting film 20 is low, the above condition can be satisfied initially; however, N1 may be larger than N2 due to cooling in the condensation zone 32 or drying in the drying zone 33 before the voids are favorably formed. In this case, N1 may be made to be smaller than N2 by raising the temperature temporally. The viscosity adjustment may be conducted plural times.

The honeycomb-structure film 12 in which the drying is advanced is peeled from the casting belt 26 with being held by the peeling roller 30, and then wound by the winder 31. Although the feeding speed of the honeycomb-structure film 12 is not limited, in order to produce the honeycomb-structure film 12 continuously, the feeding speed is preferably no less than 0.1 m/min and no more than 60 m/min. If the feeding speed at less than 0.1 m/min is not much suitable for productivity and thus unfavorable in view of the cost. If the feeding speed is more than 60 m/min, an excessive tensile force is applied to the honeycomb-structure film 12 being fed, so that the film is possibly ruptured to disturb the honeycomb structure.

Although the present embodiment exemplifies a case in which the continuous honeycomb-structure film 12 is produced by casting the polymer solution 21 continuously, the present invention is not limited to this case. For instance, the polymer solution 21 may be cast intermittently to produce a sheet-like honeycomb-structure film sequentially. In FIG. 5, components same as those in FIG. 2 are represented by same numbers. A honeycomb-structure film sheet is produced by a film-producing apparatus 310. There are a casting zone 304 in which a polymer solution is cast on a support 302, the condensation zone 32, and the drying zone 33 in the film-producing apparatus 310. In the casting zone 304, the polymer solution from the casting die 25 is cast on the support 302 being advanced, and then a casting film sheet 311 is formed. Subsequently, the support 302 on which the casting film sheet 311 is formed is sent to the condensation zone 32. After that, the casting film sheet 311 in which the droplets are formed is advanced to the drying zone 33 with the support 302 being advanced. As above, the processing in each zone is performed to each of the supports 302, and the supports 302 are intermittently advanced, so that the honeycomb-structure film sheets can be produced.

The plural casting dies of which length in the width direction is shorter than the casting die 25 are arranged in the width direction of the support 302, so that the casting film sheet having smaller width can be formed. In addition, in the casting zone 304 the support 302 is intermittently advanced at a time interval shorter than the above case, so that the smaller casting film sheets can be formed on the support. In addition, the polymer solution 21 is intermittently cast through an outlet of the polymer solution 21 in the casting die divided into plural mouths in the width direction of the honeycomb-structure film 12, so that a strip-like honeycomb-structure film may be produced sequentially.

Figure 6:
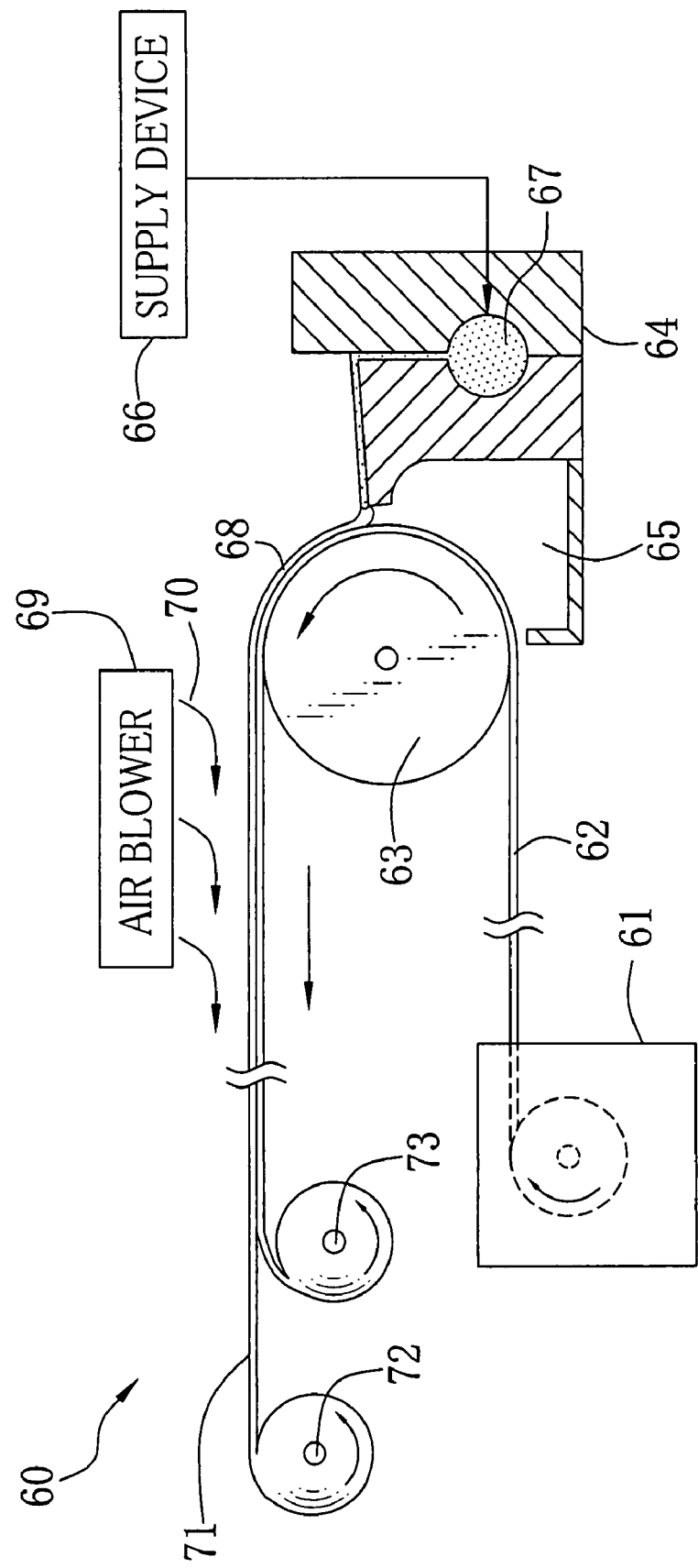
FIG. 6 is a schematic view of a film-producing apparatus in another embodiment.

In a film-producing apparatus 60 shown in FIG. 6, a web 62 as a support is sent from a delivery device 61, and then fed with being wound around a back-up roller 63. A slide coater 64 is provided in opposition to the back-up roller 63. A decompression chamber 65 is provided in the slide coater 64. A polymer solution 67 sent from a supply device 66 through a feed pump is pushed out from the slide coater 64, and then applied on the web 62 to form a casting film 68.

The slide coater 64 is excellent in uniform applicability in the feeding direction of the web 62. If there is asperity on the surface of the web 62, the surface is smoothed while the web 62 is wound around the back-up roller 63, so that the slide coater 64 is excellent in the uniform applicability. In addition, the slide coater 64 applies the polymer solution 67 on the web 62 without touching the web 62, so that it can apply the surface of the web 62 uniformly without damaging the surface of the web. Moreover, the slide coater 64 can form the casting film 68 at high speed and thus excellent in the productivity.

According to the condensing/drying process 11, droplet is contained in the casting film 68 by air 70 from an air blower 69. An upstream side of the air blower 69 in the advancing direction of the web 62 is a blowing and suctioning portion for condensing the water corresponding to the blowing and suctioning device 34; meanwhile, a downstream side of the air blower 69 is a drying portion for evaporating the solvent and the droplet corresponding to the dryer 36. After the condensing/drying process 11, the casting film 68 as a honeycomb-structure film 71 is peeled from the web 62 to be wound around a winding roll 72. The web 62 is wound around a winding roll 73. The feeding angle of the web 62 formed with the casting film 68 is preferably set within ±10° to the horizontal direction. In addition, in order to reduce the pitch between the voids of the honeycomb-structure film 71 and the size of the voids thereof, the web 62 is preferably formed by the material which is easy to absorb the organic solvent of the polymer solution 67. If the main solvent of the polymer solution 67 is methyl acetate, cellulose acylate is preferably used as the material for the web 62.

Figure 7:
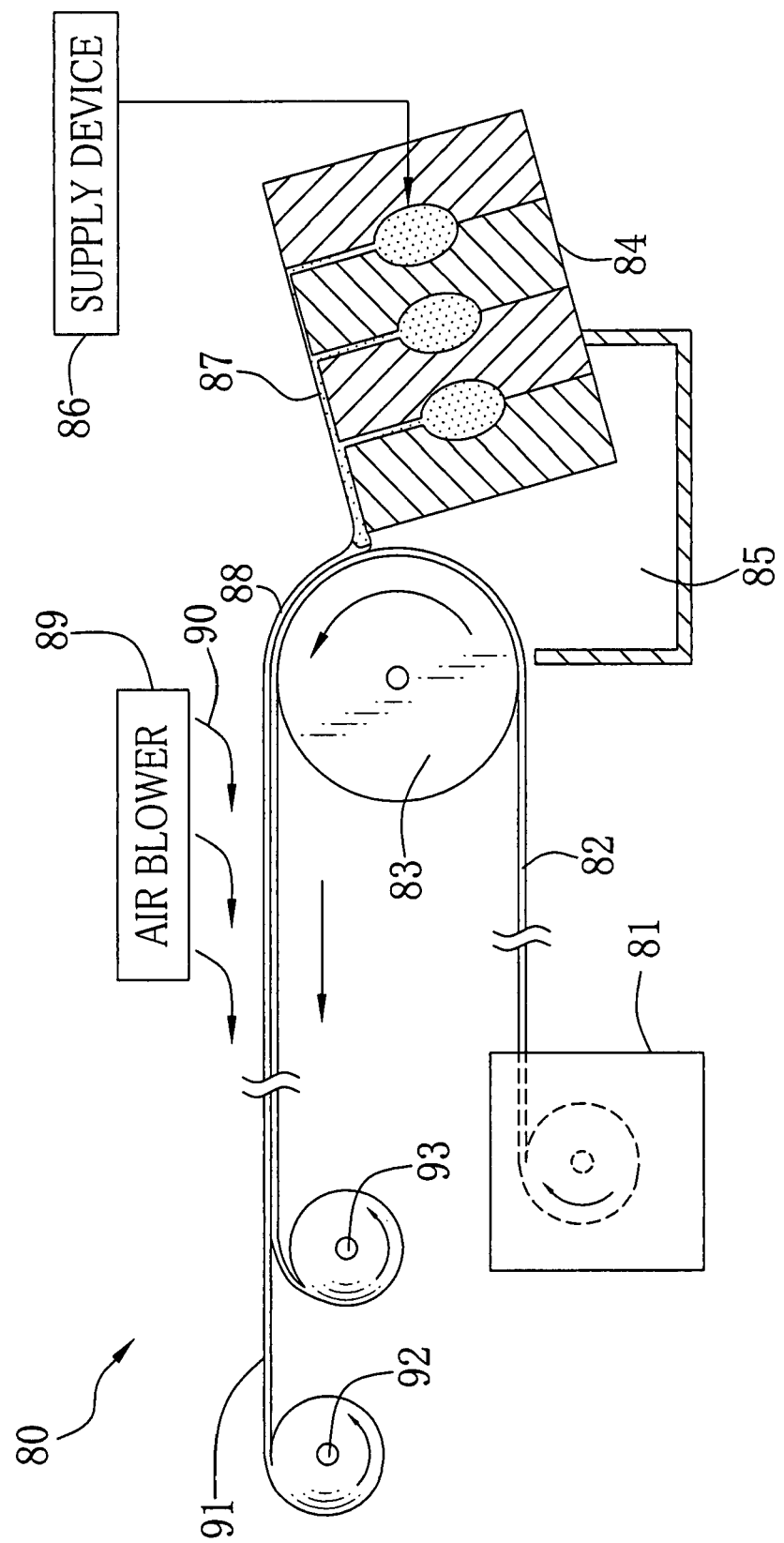
FIG. 7 is a schematic view of a film-producing apparatus in another embodiment.

In a film-producing apparatus 80 shown in FIG. 7, a web 82 as a support is sent from a delivery device 81, and then fed with being wound around a back-up roller 83. A multilayer type slide coater 84 is provided in opposition to the back-up roller 83. A decompression chamber 85 is provided in the multilayer type slide coater 84. A polymer solution 87 sent from a supply device 86 through a feed pump is pushed out from the multilayer type slide coater 84, and then applied on the web 82 to form a casting film 88. In order to uniform thickness of the casting film 88, the shape of the polymer solution 87 pushed out from the multilayer type slide coater 84 is stabilized by the decompression chamber 85. According to the condensing/drying process 11, droplet is contained in the casting film 88 by air 90 from an air blower 89, and then the casting film 88 is dried. An upstream side of the air blower 89 in the advancing direction of the web 82 is a blowing and suctioning portion for condensing the water corresponding to the blowing and suctioning device 34; meanwhile, a downstream side of the air blower 89 is a drying portion for evaporating the solvent and the droplet corresponding to the dryer 36. After the condensing/drying process 11, a honeycomb-structure film 91 and the web 82 are respectively wound around winding rolls 92, 93.

The plural flows of the polymer solution 87 are overlaid to be cast on the web 82, so that the shape of the honeycomb-structure film 91 in the thickness direction and the properties of matter thereof can be changed.

Figure 8:
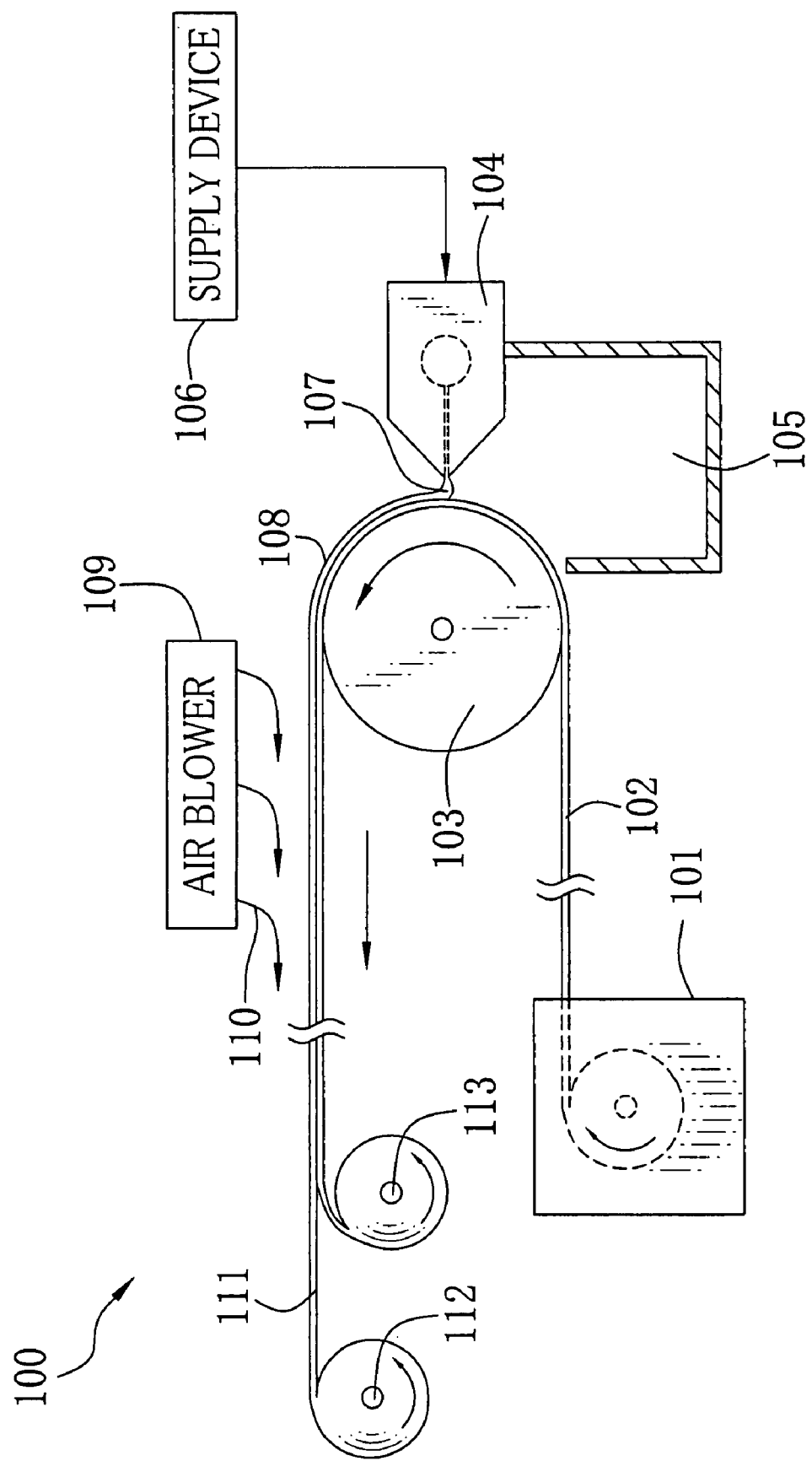
FIG. 8 is a schematic view of a film-producing apparatus in another embodiment.

In a film-producing apparatus 100 shown in FIG. 8, a web 102 as a support is sent from a delivery device 101, and then fed with being wound around a back-up roller 103. An extrusion coater 104 is provided in opposition to the back-up roller 103. A decompression chamber 105 is provided in the extrusion coater 104. A polymer solution 107 sent from a supply device 106 through a feed pump is pushed out from the extrusion coater 104, and then applied on the web 102 to form a casting film 108. According to the condensing/drying process 11, droplet is contained in the casting film 108 by air 110 from an air blower 109, and then the casting film 108 is dried. An upstream side of the air blower 109 in the advancing direction of the web 102 is a blowing and suctioning portion for condensing the water corresponding to the blowing and suctioning device 34; meanwhile, a downstream side of the air blower 109 is a drying portion for evaporating the solvent and the droplet corresponding to the dryer 36. After the condensing/drying process 11, a honeycomb-structure film 111 and the web 102 are respectively wound by winding rolls 112, 113.

Figure 9:
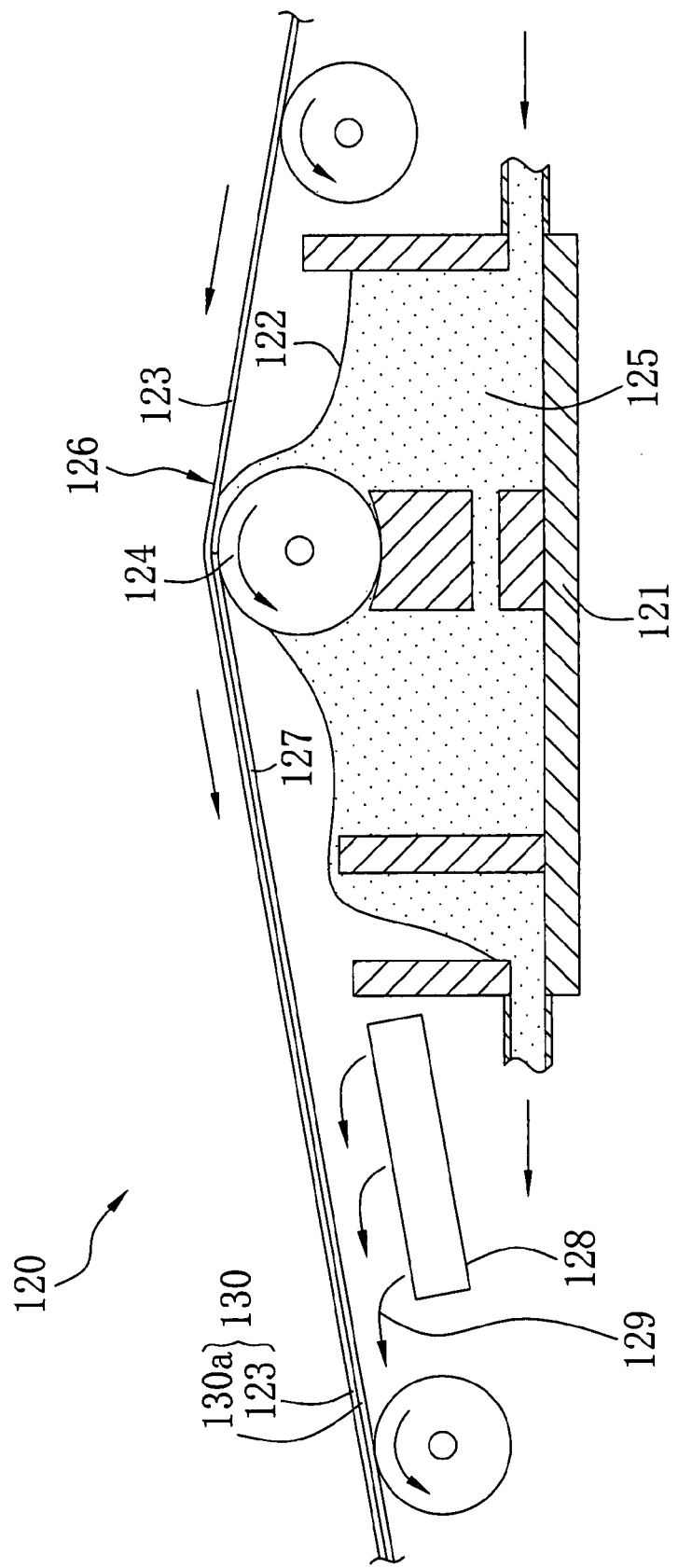
FIG. 9 is a schematic view of a film-producing apparatus in another embodiment.

In a film-producing apparatus 120 shown in FIG. 9, a polymer solution 122 is applied on a web 123 by using a wire-bar coating machine 121. A wire bar 124 rotates in a moving direction of the web 123 moving at constant speed. The polymer solution 122 is drawn up from a primary solution bath 125 to a liquid holding portion 126 in accordance with the rotation of the wire bar 124. The polymer solution 122 in the liquid holding portion 126 contacts with the web 123 through the wire bar 124, so that a casting film 127 having uniform thickness is formed. According to the condensing/drying process 11, air 129 from an air blower 128 is applied to the casting film 127 to form the void in the casting film 127. Thereby, the casting film 127 becomes a honeycomb-structure portion 130a, so that a film 130 in which the honeycomb-structure portion 130a is formed on the web 123 can be obtained. When the film 130 is produced by using the wire bar 124, the liquid holding portion 126 prevents the air from mixing into a contact portion between the polymer solution 122 and the web 123, and thus the mixing of air bubbles into the casting film 127 is suppressed.

Note that the advancing method of the web 123 and the application method of the polymer solution 122 are not limited in the above methods. For instance, the polymer solution is cast to be applied on the exposure surface of the web opposite to a contact surface with the support while the web from a delivery device is advanced by the support such as an endless belt, so that the film having the web and the honeycomb-structure portion is formed. According to such a method, when the functional film having a predetermined function is used as the web, it is possible to obtain composite functional material in which the honeycomb-structure portion and the web are integrated.

In the present invention, when the honeycomb-structure films 12, 71, 91, 111, and the film 130 having the honeycomb-structure portion on the web can be used as a base film of the functional film 14.

Figure 10:
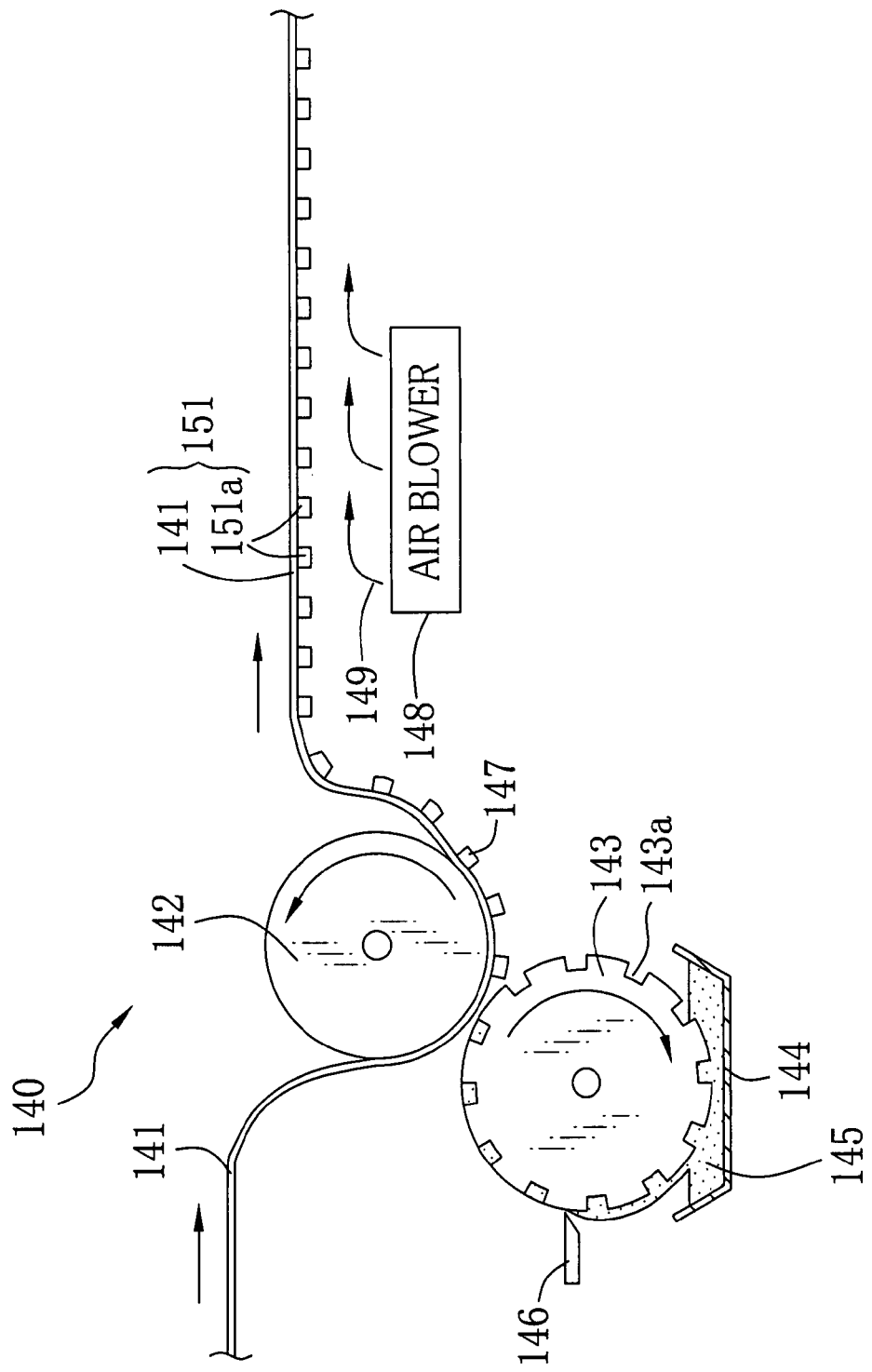
FIG. 10 is a schematic view of a film-producing apparatus in another embodiment.

In a film-producing apparatus 140 shown in FIG. 10, a web 141 is advanced while being wound around an impression cylinder 142. A plate cylinder 143 is disposed in opposition to the impression cylinder 142. A predetermined pattern is formed on a surface of the plate cylinder 143. A polymer solution 145 in a solution bath 144 is held in a recessed portion 143a of the plate cylinder 143 by rotation of the plate cylinder 143. The excessive polymer solution 145 is scraped by a doctor blade 146. Subsequently, the polymer solution 145 is applied on the web 141 to form a casting film 147. After that, according to the condensing/drying process 11, droplet is contained in the casting film 147 by air 149 from an air blower 148 to dry the casting film 147. The air 149 is parallel flow to the web 141, and flows in the same direction as the advancing direction of the web 141. After the condensing/drying process 11, the casting film 147 becomes a honeycomb-structure portion 151a, while the web 141 becomes a film 151 in which the plural honeycomb-structure portions 151a are formed on the web 141 in the intended pattern.

As above two embodiments, a multilayer structure film having the honeycomb-structure portion is included in the present invention.

As above-mentioned, the casting method of the present invention is not limited especially. A slide method, an extrusion method, a bar method, a gravure method, and the like may be applied.

The honeycomb-structure films 12, 71, 91, 111 and the films 130, 151 are changed into the functional film 14 by application of other functionalities in the functionality-application process 13. For instance, particles in which refractive index difference from the films 12, 71, 91, 111, 130, 151 is large are applied to each film, so that the functional film 14 can be obtained. The functional film 14 can be used for producing a photonic crystal, and used in laser, a light guide, and so forth. Additionally, the particle emitted by photoexcitation and conduction can be used. In this case, as the particle, there are an organic pigment, an organic dye, a luminescent rare earth compound, and so forth. The functional film to which such particles are applied can be used as a light emitting material for a thin display. Note that the functionality-application process may be performed in the process for producing the honeycomb-structure films 12, 71, 91, 111 and the films 130, 151, instead of or in addition to performing after obtaining each film. For instance, when the particles are contained in the films 12, 71, 91, 111, 130, 151, they can be previously added to the polymer solution.

Moreover, it is possible to use the particle capable of maintaining magnetism obtained under a magnetic field, light-irradiation, and so forth. Such particles are applied to the film to obtain the functional film applicable to a recording/memory material. Furthermore, as the particle, a color ball and a microcapsule can be used. The functional film to which such particles are applied can be used in a paper-like display, for example.

The particle which is chemically reacted by being selectively combined with biomedical materials, such as protein, sugar, and DNA can be applied to the functional film. Such a functional film can be used for a biotip. Note that the films 12, 71, 91, 111, 130, and 151 can be used as a cell culture substrate.

Figure 11:
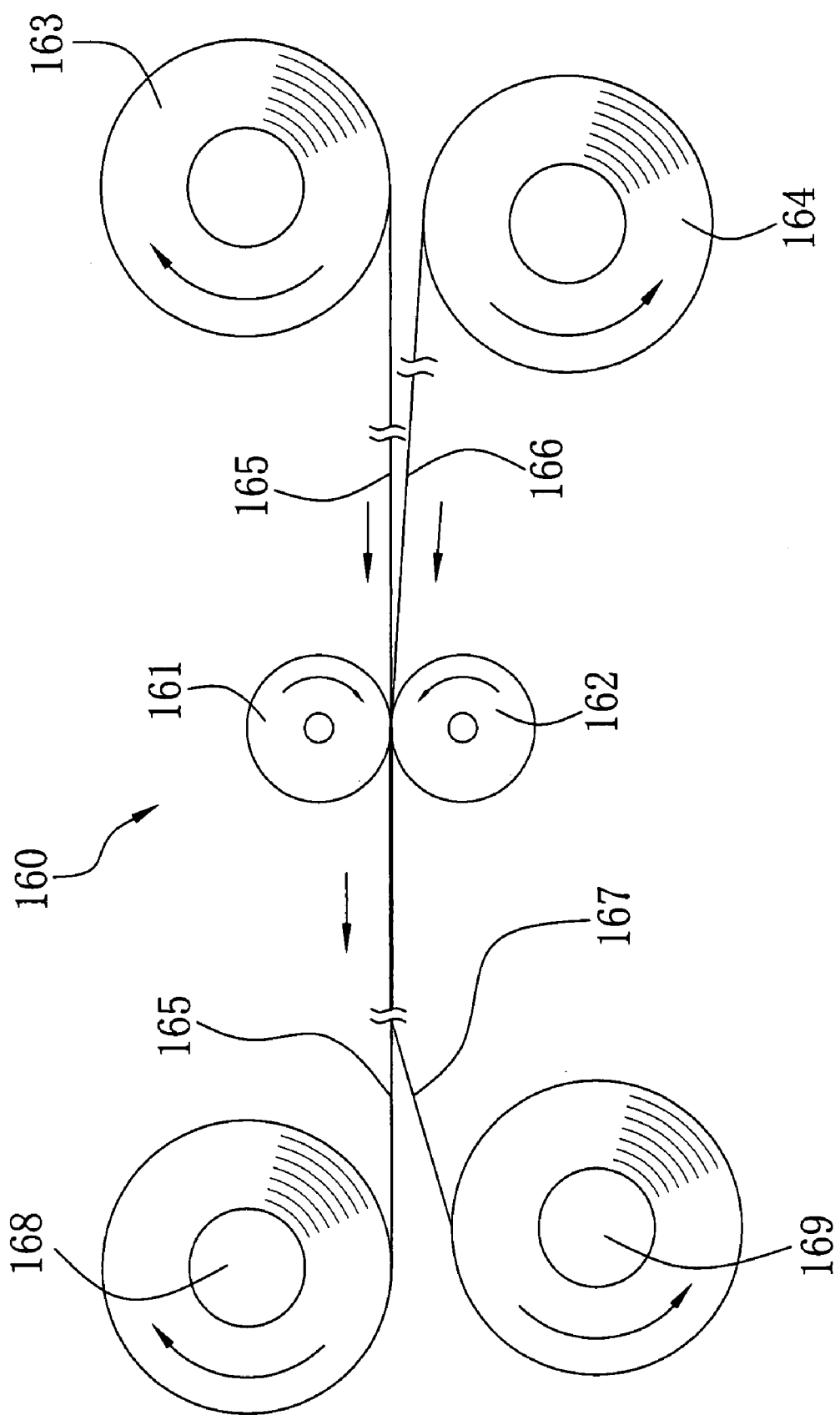
FIG. 11 is a schematic view showing a state that a film having a moth-eye structure is produced by using a honeycomb-structure film.

Next, the producing method for a moth-eye structure film is explained. In FIG. 11, a press device 160 is constituted of press rollers 161, 162. A honeycomb-structure film 165 and a film 166 are respectively drawn from a honeycomb-structure film roll 163 and a film roll 164. When the honeycomb-structure film 165 formed with concavity and convexity on one side is used as a plate, the convex-concave pattern of the honeycomb-structure film 165 is transferred on the film 166 by the press device, 160, so that a moth-eye structure film 167 on which convex shapes are arranged is obtained. The honeycomb-structure film 165 and the moth-eye structure film 167 are respectively wound by winding rolls 168, 169. Another side of the honeycomb-structure film 165 on which the convex-concave pattern is not formed is preferably sucked to generate a negative pressure such that the pattern is surely transferred to the film 166. As the honeycomb-structure film 165, the film which is hardened and the film of which the surface is metal-vapor-deposited are preferably used. The moth-eye structure 167 has a moth-eye structure, which is similar to a structure of a microlens array film and moth's eyes. There is also a moth-eye structure film having an anti-reflection function. The moth-eye structure film 167 can be produced such that the pitch of each convex portion of the convex shape is 0.1 μm-0.3 μm, and the height of the convex shape is about 0.5 to 2 times relative to the bottom.

Hereinafter, the present invention is explained more specifically by examples 1 and 5; however, the present invention is not restricted in the examples.

EXAMPLE 1

Experiments 1-5 were performed by using the film-producing apparatus 20 shown in FIG. 2. In the experiment 1, poly-ε.-caprolactone having average molecular weight of 70,000-100,000 shown in chemical formula (1) and amphipathic polyacrylamide shown in chemical formula (2) were mixed at a weight ratio of 50:1 to be used as a solute for the polymer solution. Dichloromethane were used as a solvent. The polymer solution 21 was prepared so that the concentration of the polymer compound became 0.2 wt. %. An endless stainless plate was used as the casting belt 26. The drying condition and the temperature of the casting film 40 until reaching the condensation zone 32 were controlled such that the viscosity at the time when the casting film 40 entered the condensation zone 32 was 0.8 cp. The temperature of the air 35 in the condensation zone 32 was set at 30° C., while the dew point was set at 20° C. The surface temperature TL of the casting film 40 at the time of entering the condensation zone 32 was set at 18° C. The air 35 was sent from the blowing and suctioning device 34 such that the air 35 was the parallel flow of 1 m/s to the moving speed of the casting belt 26. In the drying zone 33, the drying air 37 from the air-blowing openings 206a, 207a was set within 60° C.±3° C., while the drying air 37 from the air-blowing openings 208a, 209a was set within 110° C.±3° C. The length of the condensation zone 32 was adjusted such that the target value of the diameter D1 of the void 47 of the honeycomb-structure film 12 was 25 μm, the thickness L1 was 21 μm, and the time for passing through the condensation zone 32 was 85 seconds. The casting speed was set at 20 m/min. The feeding angle of the casting belt 26 was set within ±3° to the horizontal direction (except for the case wherein the casting belt 26 is wound around a roller).

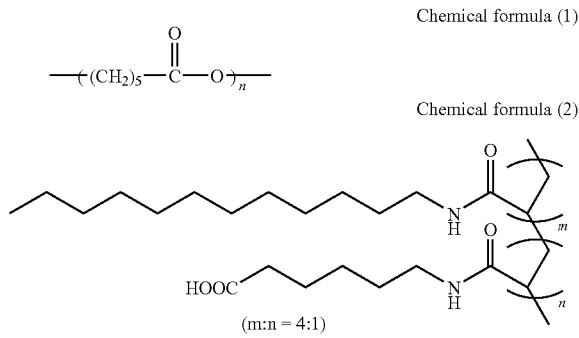

Chemical formula (1)

Chemical formula (2)

(m:n = 4:1)

The variation in diameter D1 (μm) of the void 47 was evaluated by observing the fine structure of the obtained honeycomb-structure film 12 through a scanning electron microscope (SEM). When the targeted D1 was the reference value, the case wherein the diameter was less than ±10% was represented as ○, the case wherein it was no less than ±10% and less than ±20% was represented as Δ, and the case wherein it was no less than ±20% was represented as x. As a result, in the experiment 1 the diameter in the example 1 was ±3%, so that the evaluation was ○.

In the experiment 2 in which the experiment was performed by the same condition as the experiment 1 except that the relative speed of the air 35 to the moving speed of the casting belt 26 was 0.01 m/s, the variation of the diameter D1 of the void 47 was ±16%, so that the evaluation was Δ. In the experiment 3 in which the experiment was performed by the same condition as the experiment 1 except that the relative speed of the air 35 to the moving speed of the casting belt 26 was 30 m/s, the variation of the diameter D1 was ±28%, so that the evaluation was x. In the experiment 4 in which the experiment was performed by the same condition as the experiment 1 except that the temperature fluctuation of the air 35 was no less than ±5° C. and no more than ±10° C., the variation of the diameter D1 was ±22%, so that the evaluation was x. In the experiment 5 in which the experiment was performed by the same condition as the experiment 1 except that the feeding angle of the casting belt 26 was +200, the variation of the diameter D1 was ±32%, so that the evaluation was x.

EXAMPLE 2

A flexible film formed by polyethylene terephthalate without a property of absorbing the solvent (methyl acetate) was used as the support. The honeycomb-structure film was produced such that the thickness L1 of the film was 4 μm, the diameter D1 of the void was 6 μm, and the time for passing through the condensation zone 32 was 58 seconds. Other conditions were the same as the example 1. The evaluation by using the SEM was ±8%, so that the evaluation was ○.

EXAMPLE 3

A flexible film formed by cellulose acylate having a property of absorbing the solvent (methyl acetate) was used as the support. The honeycomb-structure film was produced such that the thickness L1 of the film was 0.3 μm, and the diameter D1 of the void was 0.35 μm. Other conditions were the same as the example 2. The evaluation by using the SEM was within ±7%, so that the evaluation was ○.

EXAMPLE 4

The temperature of the air 35 in the condensation zone 32 was 38° C., the dew point was 33° C., and the surface temperature TL of the casting film 40 was 1° C. Other conditions were the same as the example 1. The evaluation by using the SEM was within ±18%, so that the evaluation was Δ.

EXAMPLE 5

The polymer solution 21 was prepared such that the density of the polymer compound was 2 wt. %. The drying condition and the temperature of the casting film 40 until reaching the condensation zone 32 were controlled such that the viscosity at the time when the casting film 40 entered the condensation zone 32 was 1.5 cp. Other conditions were the same as the example 1. The evaluation by using the SEM was within ±41%, so that the evaluation was x.

INDUSTRIAL APPLICABILITY

A film obtained by a producing method for the film of the present invention is effective as a base material of a biotip. In addition, the film can be used as an on optical material and an electronic material by containing a functional particle therein.

The invention claimed is:
1. A producing method for a film comprising steps of:
forming said film by casting a liquid including an organic solvent and a polymer compound on a support;
forming, in a first zone, droplets in said film;
forming a large number of voids in said film by evaporating said organic solvent and said droplets; and
controlling surface temperature TL(° C.) of said film is in said first zone and a dew point TD1(° C.) in said first zone so as to satisfy the following condition: 80° C.≧TD1−TL.
2. A producing method described in claim 1, wherein the following condition is satisfied in said first zone:

$TD1-TL \geq 0°$ C.

3. A producing method described in claim 2, wherein each variation of TL at the time when said film enters said first zone, a dew point in the vicinity of an advancing path of said film immediately before said first zone, and a dew point in the vicinity of said advancing path immediately after said first zone is within ±3° C.

4. A producing method described in claim 3, wherein water in air sent to said film is condensed to form said droplets in said first zone, relative speed of said air and said film being advanced is no less than 0.1 m/s and no more than 20 m/s.

5. A producing method described in claim 4, wherein variation of said relative speed is within ±20% of an average value of said relative speed.

6. A producing method described in claim 5, wherein said film after being passed through said first zone is advanced to a second zone in which a dew point is TD2(° C). and the following condition is satisfied: TL−TD2≧1° C., and passed through said second zone.

7. A producing method described in claim 6, wherein the following condition is satisfied in said second zone:

$$80° C. \geq TL-TD2.$$

8. A producing method described in claim 7, wherein each variation of TL at the time when said film enters said second zone, a dew point in the vicinity of said advancing path immediately before said second zone, and a dew point in the vicinity of said advancing path immediately after said second zone is within ±3° C.

9. A producing method described in claim 8, wherein a time when said film passes through said first zone is adjusted within a range of 0.1 seconds to 100 seconds, to adjust condition of said voids.

10. A producing method described in claim 9, wherein a feeding angle of said film in said first zone is within ±10° to a horizontal direction.

11. A producing method described in claim 10, wherein a film advancing path for said film reaching said first zone and the horizontal direction form an angle within 10°.

12. A producing method described in claim 11, wherein air is sent to said film to evaporate said droplet and said organic solvent from said film in said second zone.

13. A producing method described in claim 12, wherein cleanness of said air in said first and/or second zone is no more than class 1000.

14. A producing method described in claim 13, wherein said film is a honeycomb-structure film.

15. A producing method described in claim 14, wherein TL is no less than 0° C.

16. A producing method described in claim 15, wherein temperature of said support is kept at no less than 0° C. and at lower than a boiling point of said organic solvent, variation of TL in a width direction of said support is within ±3° C.

17. A producing method described in claim 16, wherein said support is formed by an endless member, only said film is peeled from said endless member.

18. A producing method described in claim 16, wherein said support is formed by a flexible member, only said film is peeled from said flexible member.

19. A producing method described in claim 18, wherein said flexible member is formed by said polymer compound.

20. A producing method described in claim 19, wherein said flexible member has a property of absorbing a part of said organic solvent.

21. A producing method described in claim 20, wherein said liquid is cast by at least one of a slide method, an extrusion method, a bar method, and a gravure method.

22. A producing method described in claim 21, wherein said film is dried by a decompression drying method and/or a 2D nozzle method.

23. A producing method described in claim 22, wherein at least one of ultraviolet ray and electron ray is irradiated to said film.

24. A producing method described in claim 23, wherein viscosity of said liquid is N1, and that of said droplet is N2, the following condition is satisfied: N1<N2.

25. A producing method described in claim 24, further comprising: a first filtering step of removing foreign matters by filtering said organic solvent and/or said liquid.

26. A producing method described in claim 25, wherein a filter of absolute filtering accuracy which is larger than a diameter of said void is used in said first filtering step.

27. A producing method described in claim 26, further comprising: a second filtering step of filtering by using a filter of the absolute filtering accuracy which is smaller than the diameter of said void after said second filtering step.

28. A producing method described in claim 27, wherein evaporation speed of said organic solvent is V1, and that of said droplet is V2, the following condition is satisfied: V1>V2.

29. A producing method described in claim 28, wherein said liquid includes particles for applying a function to said film, said film including said particles is formed.

30. A producing method described in claim 29, wherein said particles are microcapsules.

31. A producing method described in claim 30, wherein said film is self-organized to form said voids by forming said droplets and evaporating said organic solvent and said droplets.

32. A producing method for plural layer film comprising steps of:
   advancing a flexible web by a rotating support;
   forming a coating layer by applying liquid including an organic solvent and a polymer compound on said web;
   forming, in a first zone, droplets in said coating layer;
   forming a large number of voids in said coating layer by evaporating said organic solvent and said droplets, and
   controlling surface temperature TL(° C). of said coating layer in said first zone and a dew point TD1(° C). min said first zone so as to satisfy the following condition: 80° C.≧TD1−TL.

33. A producing method for a film comprising steps of:
   forming said film by casting a liquid including an organic solvent and a polymer compound on a support;
   forming, in a first zone, droplets made from a material which is different from said liquid on said film;
   evaporating said droplets after evaporating said organic solvent from said film to form said plural voids in said film, and
   controlling surface temperature TL(° C). of said film in said first zone and a dew point TD1(° C). in said first zone so as to satisfy the following condition: 80° C.≧TD1−TL,.

34. A producing method described in claim 33, wherein evaporation speed of said organic solvent is different from that of said droplet.

35. A producing method described in claim 34, wherein gas in the vicinity of said film is condensed to generate said droplet.

36. A producing method described in claim 35, wherein said gas is condensed by satisfying the following condition:

$$TD1-TL \geq 0° C.$$

37. A producing method described in claim 36, wherein said droplets enter into said film with evaporating said organic solvent.

38. A producing method described in claim 37, wherein said film is formed continuously by applying said liquid on said support being advanced, and air in which relative speed to advancing speed of said support is no less than 0.1 m/s and no more than 20 m/s is sent from an air blower to said film, wherein said condensed gas is water vapor contained in said air.

39. A producing method described in claim 38, wherein variation of said relative speed is within ±20% of an average value of said relative speed.

40. A producing method described in claim 39, wherein time for sending said air to said film is no less than 0.1 seconds and no more than 100 seconds.

41. A producing method described in claim 40, wherein the dew point of said gas in the vicinity of said film in which said droplets are formed therein is TD2(° C.), growth of said droplets is stopped and said organic solvent is evaporated by defining as TL−TD2≧1° C.

42. A producing method described in claim 41, wherein the following condition is satisfied:

$$80° C. \geq TL - TD2.$$

43. The producing method as described in claim 1, wherein said surface temperature TL is controlled by controlling temperature of said support.

* * * * *